Feb. 13, 1945.  C. A. CARLSON ET AL  2,369,338
BEARINGS FOR CLOCKS, WATCHES, AND PRECISION INSTRUMENTS
Filed Oct. 6, 1943
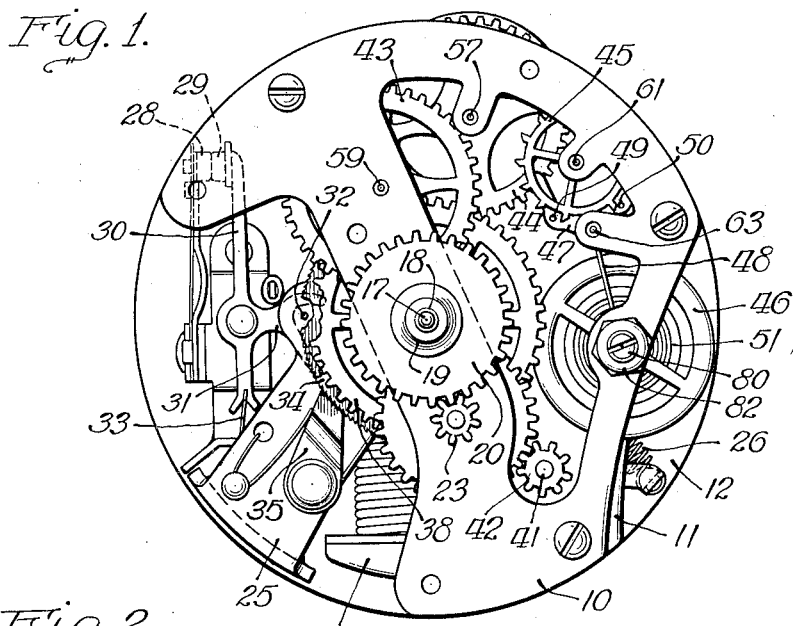
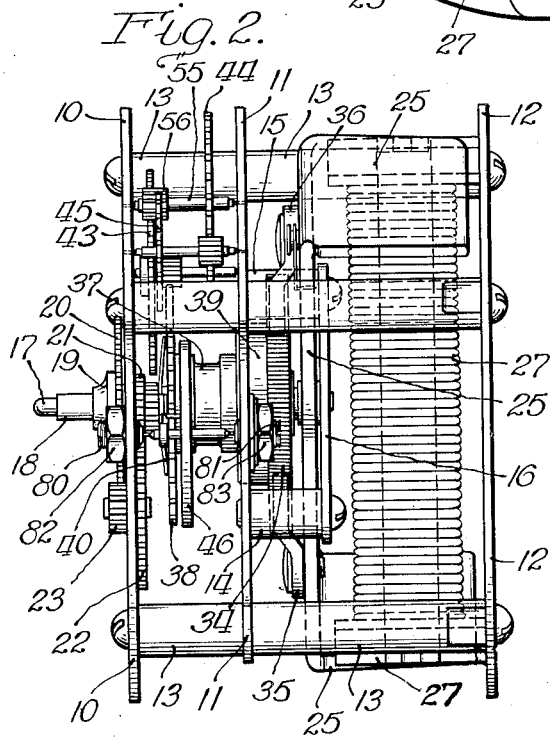
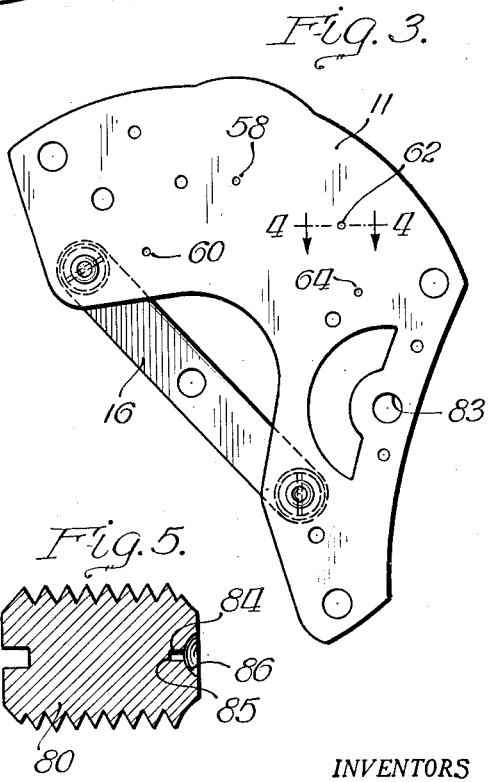
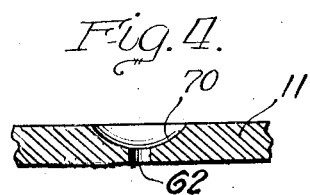
INVENTORS
Chester A. Carlson
William R. Butler
By: Richardson and Greer
Attys.

Patented Feb. 13, 1945

2,369,338

UNITED STATES PATENT OFFICE 2,369,338

BEARINGS FOR CLOCKS, WATCHES, AND PRECISION INSTRUMENTS

Chester A. Carlson, Delavan, and William R. Butler, Milwaukee, Wis.; said Butler assignor to Aluminum Company of America, Pittsburgh, Pa., a corporation of Pennsylvania; said Carlson assignor to George W. Borg Corporation, Delavan, Wis., a corporation of Delaware Application October 6, 1943, Serial No. 505,176

11 Claims. (Cl. 58—2)

The present invention relates in general to timepieces, including clocks and watches, and to other precision instruments; and the object of the invention is to reduce the cost and increase the life of such instruments.

The immediate object of the invention is to produce a new and improved automobile clock, but the invention is applicable to other types of clocks such as alarm clocks, to watches, and to other instruments, as will be made clear hereinafter.

As applied to a clock or watch, the invention relates more in particular to the bearings for the pivots of the gears in the gear train. In an automobile clock, for example, the gears are supported in a frame comprising two spaced plates, made of brass, and the gear pivots have bearings in holes formed in the frame plates. The smaller bearing holes are drilled in the plates, while the larger holes may be punched and shaved to the exact size. Such bearings have given good service, but the construction is not ideal. The harder varieties of brass known as spring brass cannot be used because frame plates made of spring brass cannot be made absolutely flat as required in the frame of a clock, and the less hard varieties which are necessarily used are subject to wear. As a result the bearings become enlarged in service and the timekeeping qualities are adversely affected.

It will be appreciated, of course, that the use of jeweled bearings, which would eliminate the trouble due to wear of the brass bearings, is not practicable in an automobile clock, due to the cost. The use of brass frame plates in fact is expensive, as the cost of brass is relatively high as compared to the cost of other non-corrosive metals and alloys such as aluminum and alloys thereof.

In this situation we have discovered that a very high grade clock can be manufactured at low cost by fabricating the frame plates from aluminum or an aluminum alloy and by subjecting the plates to a treatment which produces a very hard coating of aluminum oxide. The hardening process is effective over the interior surface of the bearing holes and bearings are thus formed which are free from wear and are substantially the equivalent of jeweled bearings.

The invention and the various features thereof will be described more fully hereinafter, reference being made to the accompanying drawing, in which—

Fig. 1 is a front view of the movement of an automobile clock embodying the invention, with the dial and hands removed;

Fig. 2 is a side view of the same movement, taken from the right in Fig. 1, except that some of the parts not involved in the invention have been omitted;

Fig. 3 is a top view of one of the intermediate frame plates such as is used in the movement shown in Figs. 1 and 2;

Fig. 4 is a section through one of the bearing holes, on the line 4—4, Fig. 3; and Fig. 5 is a section through one of the pivot screws for the balance arbor.

Referring to the drawing, the clock movement illustrated therein is a self-winding electrical clock movement such as is used in automobile clocks, and is of known construction, except for those parts with which the invention is concerned. It will be desirable nevertheless to describe briefly the general construction and operation of the clock movement as a preliminary to a more detailed description of the invention.

The various parts are supported on a frame comprising the front plate 10, the center plate 11, and the back plate 12, which are held together in spaced relation by means of screws, and pillars or posts such as 13 in the usual manner. The front and center plates 10 and 11 are made of aluminum or aluminum alloy, as will be described more in detail hereinafter. These two frame plates are shaped as shown in Figs. 1 and 3, respectively. The back plate 12 may be of aluminum also and is circular in shape. The frame also includes the bridge member 16, which is secured to the center plate 11 by means including the posts 14 and 15.

The reference character 17 indicates the center shaft, which is rotatable in bearings in the front plate 10 and the bridge member 16, as will be understood from Figs. 2 and 3. This shaft may also be referred to as the minute-shaft. The minute-hand is attached to the end of the shaft in the usual manner, where it is held by friction.

The reference numeral 18 indicates a sleeve on which the hour-hand is mounted. This sleeve together with the associated hub 19 and gear 20 is rotatable on shaft 17. The gear 20 is driven from shaft 17 by means of the pinion 21, fixed to shaft 17 below the front plate 10, the gear 22, and the pinion 23. This is the usual arrangement for driving the hour-hand from the minute-shaft.

The driving mechanism will next be explained briefly. There is a U-shaped bi-polar armature 25 which is rotatably mounted on center shaft 17, and is urged in a clockwise direction, Fig. 1, by a coil spring 26. This spring is partly shown in Fig. 1 but has been omitted from Fig. 2 in order to avoid obscuring other parts. It is the power spring which drives the clock. The armature 25 is provided with two pawls 35 and 36, by means of which it drives the ratchet wheel 34, also rotatably mounted on center shaft 17. There is another pawl, not shown but mounted on the center frame plate 11, which prevents retrograde movement of ratchet wheel 34. In addition to the armature 25 and ratchet wheel 34, the center shaft rotatably supports the barrel-shaped member 37, which carries the center gear 38 at one end and the spring housing 39 at the other end. A spring inside the housing provides a driving connection from ratchet wheel 34 to the member 37 and center gear 38. This spring, together with the pawl for preventing retrograde movement of the ratchet wheel, is the usual arrangement for maintaining power during winding.

The armature 25 is shown in run-down or unwound position in Fig. 1. It is wound, or rotated in a counter-clockwise direction, by means of an electromagnet 27. The circuit of the electromagnet is controlled by a pair of contacts 28 and 29, the latter of which is mounted on the pivoted toggle lever 30. This lever has a forked extension 31, whereby it is controlled by means of a pin 32 projecting downward from armature 25. A short leaf spring 33 cooperates with the lever 30, to effect a snap action in opening and closing the contact 28—29.

When the clock is connected to a source of current, that is, when it is running, the armature 25 remains in the unwound position only for an instant. The contact 28—29 being closed, the electromagnet is energized and the armature 25 is rotated about 30 degrees to a position in which it is nearly parallel to the core of the electromagnet. Near the end of this movement the pin 32 on armature 25 engages the forked extension 31 and rotates the toggle lever 30, causing it to open the contact 28—29 with a snap action. The electromagnet accordingly deenergizes. The rotation of the armature 25 as described tensions the spring 26, which now returns the armature slowly toward its unwound position, driving the ratchet wheel 34 by means of pawls 35 and 36. Eventually the pin 32 again engages the forked extension 31 and operates the lever 30 to close contacts 28—29 again, whereupon the clock is rewound as described. Winding takes place about twenty to twenty-five times per hour.

The center gear 38 drives the center shaft, or minute-shaft, by means of a friction washer 40 which is interposed between the gear and the hub of pinion 21. This impositive drive permits setting of the hands by means of the usual setting mechanism which includes the shaft 41 and pinion 42, Fig. 1 (not shown in Fig. 2).

The center gear 38 also drives the clock train, comprising the gear wheel 43, the gear wheel 44 and the escape wheel 45, with their associated pinions. The escape wheel drives the balance 46 by means of an escapement mechanism which includes the pivoted escape lever 48 and the anchor 47, the latter carrying the pallets 49 and 50. The escapement is a form of the well known detached lever escapement and need not be further described. The hair-spring 51 is associated with the balance 46 in known manner. The balance has a periodic oscillatory movement and through the medium of the escapement controls the rate of rotation of the escape wheel and other parts, including the minute- and hour-hands previously mentioned.

The gear wheels 43 and 44 and the escape wheel 45 with their associated pinions are mounted on arbors. The arbors are of reduced diameter at the ends forming pivots which have bearings in the front plate 10 and the center plate 11. The construction may be explained, for example, in connection with the gear wheel 44, Figs. 1 and 2, which is supported on the arbor 55, made of steel. The pinion 56 is also mounted on arbor 55. The arbor is turned down at both ends to form pivots which run in bearings 57 and 58 in frame plates 10 and 11, respectively. The gear wheel 43 is similarly supported, its arbor pivots having bearings 59 and 60 in plates 10 and 11, respectively. The bearings for the pivots of the escape wheel arbor are indicated at 61 and 62, and are located in frame plates 10 and 11, respectively. The oscillating escapement lever 48 is also mounted on a steel arbor, having pivots formed at the ends. The bearings for the pivots of the escapement lever arbor are indicated at 63 and 64 and are located in the frame plates 10 and 11, respectively.

The bearings referred to in the preceding paragraph are holes properly formed in the frame plates 10 and 11, as will shortly be explained more in detail. For satisfactory operation of the clock over a reasonably long period, the bearings must be accurately located and must not be subject to wear, which has the effect of changing the relative location of the arbors and the gears and pinions supported thereon. In a good watch the corresponding bearings are jeweled. In a clock having brass frame plates the wear is considerable, especially at the bearings which support the escape wheel and the escapement lever, these being the parts (next to the balance) which have the fastest movement. By our invention all the bearings mentioned are non-wearing, as well as the bearings for the center shaft 17 in the front plate 10 and bridge member 16, where the danger of wear is the least.

As indicated hereinbefore, the frame plates 10 and 11 are made of aluminum or alloys thereof which are susceptible to having aluminum oxide coatings formed thereon. Aluminum base alloys are preferred to pure aluminum because of the greater strength of the alloys. Especially desirable alloys are those the physical properties of which can be improved by a heat treatment, in which one or more of the alloying ingredients is placed in solid solution in the aluminum. Such alloys and the heat treatment thereof are well known in the art. As examples of excellent alloys which can be used, the duralumin and "super-duralumin" alloys may be mentioned, as well as an alloy containing about 0.95 per cent magnesium, 0.55 per cent silicon, 0.25 per cent chromium, and 0.25 per cent copper, the balance being aluminum.

The frame plates are stamped from sheets of the material to be used, in the usual and known manner. The various holes are then formed in any suitable manner. The larger holes may be formed by a punching process, for example. The small pivot bearing holes such as 57, 59, etc., cannot be punched because of the thickness of the plate, which is at least twice the diameter of the holes. These small bearing holes are drilled, therefore, with the aid of a template which insures accurate location. Drilling is preferable to punching anyway, since it insures a smoother and more polished bearing hole. If desired, all the holes may be drilled and this method of forming the holes is recommended.

The holes should be made sufficiently oversize to allow for the thickness of the aluminum oxide coating to be formed thereon, as described hereinafter. Ordinarily an aluminum oxide coating which is from .0001 to .0015 of an inch in thickness is sufficient, and the bearing holes should be made correspondingly oversize.

The frame plates made as described in the foregoing are subjected to counter-sinking operations which reduce the thickness of the plates at the pivot bearing holes. The plates are countersunk on the outside, leaving a plane surface on the inside where the plates are engaged by the shoulders on the arbors. A section through a countersunk pivot bearing hole is shown in Fig. 4, where 62 indicates the bearing hole and 70 the recess or depression formed by the countersinking operation. The object of countersinking is twofold. The reduction in the thickness of the frame plate tends to reduce the friction at the bearing, by reducing the area of the bearing surface, and the recess which is formed aids in retaining oil.

Bearing holes formed as described will usually be sufficiently smooth. If desired, however, and as an extra precaution, a burnishing tool may be used to further polish the bearing holes and insure the removal of accidental burrs or other imperfections.

After all the mechanical operations have been performed on the frame plates, they are subjected to a process which forms on the plates a coating of aluminum oxide. There are a number of known processes which may be used for this purpose, among which may be mentioned the process disclosed in the U. S. Patent to Gower, No. 1,869,058.

As a specific example of a suitable procedure for producing the oxide coating by this process, the plates, after being thoroughly cleaned and de-greased, may be made the anode for about one-half hour in an electrolytic bath comprising an aqueous solution of sulfuric acid containing about 15 per cent by weight of sulfuric acid, a current density of 12 amperes per square foot of metal surface being treated being maintained.

The coating covers the entire surface of the plates, including the interior surfaces formed by the pivot bearing holes. The coating consists mainly of aluminum oxide and is extremely hard, but is nevertheless firmly coherent to the underlying metal. It is minutely pervious, the pores being of submicroscopic size. In addition, it is adsorbent and of substantial thickness as compared with the coating of aluminum oxide which forms on aluminum and its alloys upon contact of the metal with air.

After the anodic treatment the plates are washed in water and dried. They are then given an oil sealing treatment, which consists in immersing them for a short time in a suitable oil. A light graphitic lubricating oil may be used, for example. The oil fills the pores of the aluminum oxide coating and a considerable amount is thus retained in the coating. The oil retained at the bearing surfaces aids in reducing the friction at the bearings, and insures a certain amount of lubrication in case the usual lubrication should fail for any reason.

The bridge members such as 16 may be given the same treatment as the plates, preferably before they are assembled to the associated plates 11.

From all the foregoing it will be seen that the clock described, having frame plates of aluminum or aluminum alloy on which an aluminum oxide coating has been formed, is thereby provided with bearings such as 57, 58, etc., which are very much superior in hardness to the bearings in clocks having brass frame plates. The oxide coating bearings are in fact substantially equal in hardness to jeweled bearings, and are otherwise very satisfactory. They have an advantage over jeweled bearings in that they are firmly and permanently bonded to the frame plates, they are to a certain extent self-lubricating, and they are much more economical. The bearings formed in accordance with the invention make it possible for the first time to produce a high grade clock having the equivalent of jeweled bearings at a low price.

Reference may now be made to the bearings for the balance arbor 25. In clocks of the type described herein it has been the practice to mount the balance arbor in jeweled pivot screws, as otherwise the wear would be excessive. The balance is the fastest moving part of the clock. A jeweled pivot screw as commonly used contains a so-called ring stone having a hole therein slightly larger than the diameter of the arbor pivot, the ring stone forming the main bearing, and a so-called end stone which takes the thrust in a direction parallel to the axis of the arbor. We have discovered that the invention can be applied to the pivot screws and that the jewels ordinarily used can be dispensed with.

As disclosed herein, the balance arbor is supported in the clock frame by means of the two pivot screws 80 and 81, which are screwed into threaded holes in frame plates 10 and 11, respectively, and are held in place by lock nuts 82 and 83, respectively. The construction will be readily understood from Fig. 2. Fig. 1 shows the pivot screw 80 and lock nut 82. In Fig. 3 the reference numeral 83 indicates the hole in frame plate 11 for the pivot screw 81.

The details of the pivot screw 80 are shown in the sectional view, Fig. 5. The screw is made of aluminum or aluminum alloy, as described in the case of the frame plates 10 and 11, and is given the oxide coating and oil sealing treatments as described in connection with such plates. The entire screw including the bearing surfaces for the arbor pivot is thus provided with an oil-impregnated coating of aluminum oxide having the superior characteristics to which attention has been directed.

The bearing will be found at the right hand end of the screw as it appears in Fig. 5. The cylindrical surface 84 forms the main bearing surface and performs the same function as the ring stone in the usual pivot screw. The surface 85, which may be flat or slightly conical, performs the function of the end stone and takes the endwise thrust on the balance arbor. The concave depression 86 is an oil-retaining recess.

Pivot screws constructed as described in the foregoing give substantially the same service as jeweled pivot screws, and are much lower in cost.

The invention having been described, that which is believed to be new and for which the protection of Letters Patent is desired will be pointed out in the appended claims.

We claim:

1. An instrument of the type having the pivots of a gear train mounted in bearing supporting plates, having the supporting plates made of an aluminum metal, said aluminum being chemically surface hardened over the surface of the bearing holes in the piece at the bearing surfaces, whereby there is provided a bearing surface comparable or superior to the customary jeweled bearings, said bearing surface being immediately surrounded by the tough unhardened material integral with it.

2. An instrument of the type having the pivots of a gear train mounted in bearing supporting plates, having the supporting plates made of an aluminum metal, said aluminum being chemically surface hardened all over, including the surface of the bearing holes, whereby there is provided a bearing surface comparable or superior to the customary jeweled bearings, said bearing surfaces being immediately surrounded by the tough unhardened material integral with it.

3. An instrument of the type having the pivots of a gear train mounted in bearing supporting plates, having the supporting plates made of an aluminum metal, said aluminum being chemically surface hardened at the bearings, including the surface of the bearing holes, whereby there is provided a bearing surface comparable or superior to the customary jeweled bearings, said bearing surface being immediately surrounded by the tough unhardened material integral with it.

4. A plate for supporting a gear train made of an aluminum metal and having bearings for the gear pivots therein, said bearings being chemically surface hardened over their entire bearing surfaces, whereby there is provided a plate having hardened bearing surfaces integral with and firmly supported by the tough metal of the plate.

5. The process of making a supporting plate for an instrument which comprises forming the plate of an aluminum metal with openings therein suitable for bearings and then chemically surface hardening the plate throughout the bearing areas to leave a thin hardened surface immediately supported by the unhardened metal of the plate.

6. An instrument comprising a frame, bearings in said frame, gears pivoted in said bearings, said frame being of aluminum and the surfaces of said bearings being of chemically hardened aluminum integral with said frame.

7. A frame plate for supporting a gear train, said plate being made of aluminum or aluminum alloy and having holes therein forming bearings for the pivots of the gears of said train, said holes being countersunk on one side of the plate to form oil retaining depressions, and the said bearings having hard linings of substantial thickness composed of aluminum oxide formed integrally with the plate by chemical reaction.

8. A frame plate for supporting a gear train, said plate being made of aluminum or aluminum alloy and having holes therein forming bearings for the pivots of the gears of said train, said bearings having integrally formed hard linings composed of minutely pervious adsorbent aluminum oxide adapted to be impregnated with oil.

9. A pivot screw made of aluminum or aluminum alloy having a pivot bearing formed therein, said bearing including a cylindrical bearing surface adapted to support the pivot of a movable instrument part and a second bearing surface adapted to take the end thrust of said pivot, and the said bearing surfaces being composed of hard layers of aluminum oxide formed integrally with the body of the screw by chemical reaction.

10. In a pivot screw for supporting the pivot of a movable instrument part, a bearing comprising a hole formed on the axis of the screw at one end thereof, an oil retaining recess formed at the end of said bearing by countersinking said hole, and a hard pervious oil adsorbent lining for said bearing composed of aluminum oxide formed integrally with the body of the screw by chemical reaction.

11. A pivot screw for supporting the pivot of a movable instrument part, said pivot screw being made of aluminum or aluminum alloy and having a pivot bearing formed therein, and the bearing having a hard lining formed integrally with the body of the screw and composed of minutely pervious adsorbent aluminum oxide adapted to be impregnated with oil.

CHESTER A. CARLSON.
WILLIAM R. BUTLER.